United States Patent [19]

Ossberger et al.

[11] Patent Number: 4,579,506

[45] Date of Patent: Apr. 1, 1986

[54] HORIZONTAL-INFLOW, VERTICAL-OUTFLOW CROSS-FLOW TURBINE

[76] Inventors: Karl-Friedrich Ossberger, Otto-Rieder-Str. 3; Peter Partzsch, Am Bergwald-Strasse-4, both of Weissenburg, Fed. Rep. of Germany

[21] Appl. No.: 634,286

[22] Filed: Jul. 25, 1984

[30] Foreign Application Priority Data

Jul. 29, 1983 [DE] Fed. Rep. of Germany ....... 3327457

[51] Int. Cl.[4] .............................................. F01D 1/12
[52] U.S. Cl. ..................................... 415/54; 415/151
[58] Field of Search .................... 415/52, 54, 148, 151

[56] References Cited

U.S. PATENT DOCUMENTS 2,968,436  1/1961  Coester ................................ 415/54

FOREIGN PATENT DOCUMENTS

| 178228 | 7/1903 | Fed. Rep. of Germany . |
| 347271 | 2/1922 | Fed. Rep. of Germany . |
| 388530 | 12/1922 | Fed. Rep. of Germany . |
| 659759 | 12/1934 | Fed. Rep. of Germany ...... 415/151 |
| 383134 | 2/1937 | Fed. Rep. of Germany . |
| 707839 | 5/1941 | Fed. Rep. of Germany . |
| 815780 | 8/1951 | Fed. Rep. of Germany . |
| 895279 | 9/1951 | Fed. Rep. of Germany . |
| 851330 | 7/1952 | Fed. Rep. of Germany ...... 415/151 |

*Primary Examiner*—Robert E. Garrett
*Assistant Examiner*—Joseph M. Pitko
*Attorney, Agent, or Firm*—Bruns and Wall

[57] ABSTRACT

A cross-flow water turbine has a casing, a runner, a horizontal inlet and a vertical outlet. The inlet is divided by a pivoted guide vane to form a pair of inlet passages. A horizontally extending admission passage is connected to the casing at the inlet side thereof, and a vertically extending discharge passage is formed as a draft tube and connected to the casing at the outlet thereof. The inlet and the guide vane are arranged such that the inlet flow to the runner is directed downward at an angle of about 40° with respect to the horizontal, and the outlet flow from the runner is directed substantially vertically. At the outlet there are a pair of side spaces on either side of the runner resulting in an increased cross section conforming to the cross section of the draft tube. Both of these side spaces are vented to the atmosphere by a single venting valve so that the suction pressure in the draft tube does not exceed a predetermined value.

6 Claims, 1 Drawing Figure

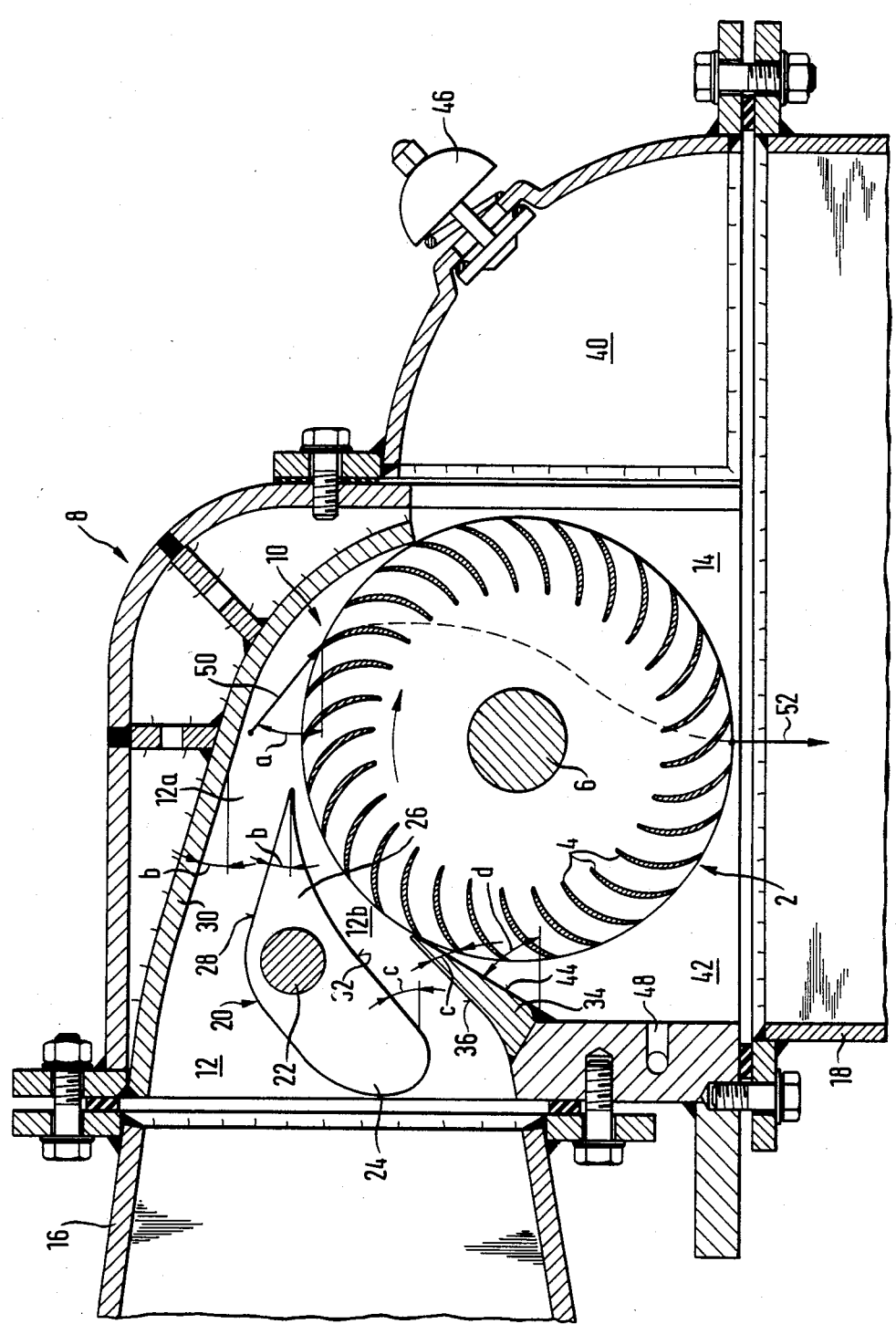

HORIZONTAL-INFLOW, VERTICAL-OUTFLOW CROSS-FLOW TURBINE

The present invention relates to a cross-flow turbine comprising a casing, a runner rotatably mounted in the casing and having a flow pattern such that the water flows substantially radially from the outside to the inside of the runner, past the center of the runner in spaced relationship thereto and then substantially radially from the inside to the outside of the runner, the flow entering the runner in an impact-free manner, a flow passage in the casing comprising an inlet area and an outlet area, with the runner being disposed in the casing flow passage, a guide vane pivotally mounted in the inlet area to close the inlet area by engaging opposite casing walls when in a closing position and dividing the inlet area in a pair of inlet passages when in its other positions, an admission tube connected to said inlet area, and a discharge tube connected to said outlet area, which discharge tube extends vertically and is formed to be a draft tube.

Cross-flow turbines of this type are known, e.g. from applicants' German Pat. Nos. 707.839, 815.780, and 895.279. With these cross-flow turbines the admission tube extends substantially vertically. In order to obtain an impact-free flow entrance to the runner, the guide vane and the inlet area of the casing flow passage direct the flow such that the resultant of the flow entering the runner has a substantially vertical component. This results in the flow leaving the runner having a substantial horizontal velocity component resulting in flow turbulence and corresponding flow losses.

Also with horizontal flow admission (see e.g. German Pat. No. 178.228) it has not been possible to avoid a flow pattern with the flow leaving the runner having a substantial horizontal velocity component.

From German Pat. Nos. 347.271, 383.134, and 388.530, there have become known cross-flow turbines wherein the flow leaving the runner at least theoretically extends in a vertical direction. Since, however, these cross-flow turbines do not have a guide vane, it is believed that in practice it is not possible to have the flow leave the runner in a substantially vertical direction.

Accordingly, it is an object of the present invention to provide a cross-flow turbine having reduced flow losses in the outlet area of the casing flow passage.

According to the present invention, a cross-flow turbine of the type as identified above is characterized in that, with said admission tube extending horizontally, the casing flow passage and the guide vane arranged such that the resultant of the flow entering the runner is inclined downwardly under an angle a of substantially 30° to 50°, preferably 40° with respect to the horizontal and the resultant of the flow leaving the runner is directed substantially vertically.

With such a cross-flow turbine the flow leaves the runner in a substantially vertical direction even though a horizontally extending admission tube is used. The invention provides for a reduction of flow turbulence in the outlet area of the casing flow passage and accordingly results in an increase of flow efficiency.

With cross-flow turbines of the above type the draft tube should be of a relatively large cross-section. In order to increase the cross-section of the casing flow passage to that of the draft tube, it has become known (e.g. from German Pat. No. 815.780) to provide the outlet area of the casing flow passage with an arcuate side space at the side of the runner remote from the admission tube. Such side space is vented from atmosphere via a resiliently biased venting valve such that suction pressure within the draft tube may not exceed a predetermined value so that the water level within the draft tube will not rise above the lowest point of the runner.

Since with the cross-flow turbine of the present invention the flow leaves the runner in a substantially vertical direction, the outlet area of the casing flow passage may have a cross-section increase on both sides of the runner. In a preferred embodiment of the present invention, there is provided a second side space increasing the cross-section of the casing flow passage on the side of the runner opposite said first side space. Preferably, such second side space is also vented from atmosphere in order to avoid flow turbulences in this area.

A preferred embodiment of the invention will be described in connection with the attached drawing showing a cross-section of a cross-flow turbine.

The cross-flow turbine shown in the drawing includes a runner 2 having a plurality of circumferentially spaced blades 4 of circular arc profile. The runner 2 mounted on a horizontal shaft 6 rotates in a casing flow passage 10 confined by a casing 8.

The casing flow passage 10 comprises an inlet area 12 and an outlet area 14. Connected to the inlet area 12 is a horizontally extending admission tube 16 of rectangular cross-section, while the outlet area 14 merges into a vertically extending discharge tube 18 being also of rectangular cross-section and serving as a draft tube.

In the inlet area 12 there is disposed a guide vane 20 adapted to be pivoted about a horizontal axis by means of a shaft 22. The guide vane 20 comprises a nose portion 24 and a trailing tail 26 inclined thereto at about 45°.

Guide vane 20 when in its fully open position (as shown in the drawing) divides inlet area 12 into a pair of inlet passages 12a and 12b. Inlet passage 12a is confined by the straight upper side 28 of the trailing edge 26 and a straight casing wall 30 associated therewith. Upper side 28 of trailing edge 26 and housing wall 30 each include with the horizontal an angle b of about 12° to 20°, preferably 16°. However, it is to be noted that upper side 28 of trailing edge 26 and housing wall 30 slightly converge with respect to each other so that inlet passage 12a is of slightly decreasing cross-section as seen in flow direction when guide vane 20 is in its fully open position.

Inlet passage 12b is confined by the straight lower side 32 of nose portion 24 and the opposed upper side 36 of a casing wall 34. The lower side 32 of nose portion 24 and the upper side 36 of casing wall 34 each include with the horizontal an angle c of about 40° to 50°, preferably 45° when guide vane 20 is in its fully open position. However, it is to be noted also in this case that inlet passage 12b slightly converges as seen in flow direction to achieve a corresponding velocity increase of the flow.

Guide vane 20 is adapted to be adjusted from its fully open position (as shown in the drawing) through intermediate positions to a closing position at which trailing edge 26 engages casing wall 30 and nose portion 24 engages casing wall 34 to thereby close the inlet area 12.

Outlet area 14 comprises at the right side (as seen in the drawing) a side space 40 increasing the cross-section of the casing flow passage and confined by an arcuate casing wall. On the left side (as seen in the drawing) there is a somewhat smaller side space 42 confined by the lower side 44 of casing wall 34 and a vertical wall of casing 8. The side spaces 40, 42 increase the cross-section of casing flow passage 10 to the cross-section of discharge tube 18 which theoretically should be endless and in practice is twice the size of the entrance cross-section of inlet area 12.

To prevent the water level within discharge tube 18 from rising above the lowest point of runner 2, side space 40 is vented from atmosphere by a resiliently biassed venting valve 46 so that suction pressure inside space 40 may not exceed a predetermined value.

While theoretically venting of side space 40 to maintain a predetermined water level in discharge tube 18 should be sufficient, practice has shown that turbulence losses in side space 42 caused by rotation of the runner may be reduced by also venting side space 42 from atmosphere. To this end side space 42 is connected to a conduit 48 which preferably is vented from atmosphere also via venting valve 46.

In operation water flows from admission tube 16 in horizontal direction into inlet area 12 where the water flow is divided by guide vane 20 extending across the whole width of the inlet area 12 into a pair of partial streams flowing through inlet passages 12a and 12b and being united downstream of trailing edge 26. The united stream enters the runner 2 in the area between trailing edge 26 and the lower end of casing wall 30. As shown by an arrow 50, the flow direction is such that the flow resultant includes with the horizontal an angle a of approximately 30° to 50°, preferably 40°. The geometry of the flow passage and the vanes 4 of runner 2 and the speed of runner 2 are chosen such that the flow enters runner 2 in a substantially impact free manner.

As indicated by a dotted line, the water stream flows through the interior of runner 2 in an off-center area and thereafter leaves the runner in the area of the lowest point of runner 2. At this point, the flow resultant is directed substantially downwards as indicated by an arrow 52.

In the inlet passage 12a the flow resultant is downwardly inclined under an angle b of about 12° to 20°, preferably 16° with respect to the horizontal, while the flow resultant in inlet passage 12b is upwardly inclined under an angle c of about 40° to 50°, preferably 45° with respect to the horizontal. This geometry results in the desired flow pattern of the flow entering and leaving runner 2.

When guide vane 20 is in its intermediate positions under partial load conditions, the flow pattern at least theoretically is the same.

Due to this flow pattern, in particular due to the vertical outlet flow, and due to the double venting of the outlet area there is a reduction of turbulence losses in the outlet area 14 resulting in an increased flow efficiency.

What is claimed is:

1. In a cross-flow turbine comprising a casing; a runner rotatably mounted in the casing and having a flow pattern such that water flows therethrough substantially radially from the outside to the inside of the runner, past the axis of the runner in spaced relation thereto, and then substantially radially from the inside to the outside of the runner, the flow entering the runner in an impact free manner; a flow passage in the casing comprising an inlet area and an outlet area, with the runner being rotatably disposed in the flow passage; a guide vane pivotally mounted in the inlet area to close the inlet area by engaging opposite casing walls when the guide vane is in a closing position and dividing the inlet area into a pair of inlet passages when the guide vane is in other positions, the guide vane having a leading nose portion and a trailing tail portion extending obliquely to the nose portion; a horizontally extending admission tube connected to said inlet area; and a discharge tube connected to said outlet area and extending vertically and being formed as a draft tube; the improvement wherein the casing flow passage and the guide vane are arranged such that the resultant of the flow entering the runner is inclined downwardly under an angle (a) of substantially 30° to 50° with respect to the horizontal, and such that the resultant of the flow leaving the runner is directed substantially vertically; wherein said guide vane, in its fully open position, has the upper side of its trailing tail, and an associated casing wall confining one of said pair of passages, both inclined downwardly at an angle (b) of about 12° to 20° with respect to the horizontal; and wherein said guide vane, in its fully open position, has the lower side of the nose portion and an associated casing wall confining the other of said pair of inlet passages are both inclined upwardly at an angle c) of about 40° to 50° with respect to the horizontal.

2. The cross-flow turbine of claim 1, in which the outlet area of said casing flow passage comprises a first side space increasing the cross-section of the casing flow passage at the side of the runner remote from said admission tube, and in which the outlet area (14) of said casing flow passage (10) comprises a second side space (42) increasing the cross-section of said casing flow passage (10) on the side of the runner (2) opposite to said first side space (40).

3. The cross-flow turbine of claim 2, in which said second side space (42) is confined by the lower side (44) of a casing wall (34) inclined upwardly and extending to the periphery of the runner (2), the upper side (36) of said casing wall together with said guide vane (24) confining one (12b) of said pair of inlet passages.

4. The cross-flow turbine of claim 3, characterized in that the lower side (44) of said casing wall (34) is inclined with respect to the horizontal under an angle (d) of about 50° to 70°.

5. The cross-flow turbine of claim 3 or claim 4, in which the first side space is vented from atmosphere by a resiliently biassed venting valve to maintain a predetermined suction pressure therein, in which said second side space (42) is also vented from atmosphere to maintain a predetermined suction pressure therein.

6. The cross-flow turbine of claim 5, in which said second side space (42) is connected to said venting valve (46) of said first side space (40) by means of a conduit (48).

* * * * *